(12) United States Patent
Bixon et al.

(10) Patent No.: US 8,266,599 B2
(45) Date of Patent: Sep. 11, 2012

(54) OUTPUT FROM CHANGED OBJECT ON APPLICATION

(75) Inventors: Erez Bixon, Tel Aviv (IL); Ofer Mekmal, Rishon Letzion (IL); Yoav Eilat, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1016 days.

(21) Appl. No.: 12/241,730

(22) Filed: Sep. 30, 2008

(65) Prior Publication Data

US 2009/0125876 A1 May 14, 2009

Related U.S. Application Data

(60) Provisional application No. 61/002,850, filed on Nov. 13, 2007.

(51) Int. Cl.
*G06F 9/44* (2006.01)
(52) U.S. Cl. ...................................................... 717/131
(58) Field of Classification Search .......... 717/101–103, 717/120–133
See application file for complete search history.

(56) References Cited

U.S. PATENT DOCUMENTS

| | | | |
|---|---|---|---|
| 2003/0084425 A1 | 5/2003 | Glaser | |
| 2005/0166094 A1 | 7/2005 | Blackwell | |
| 2005/0193381 A1 | 9/2005 | Hellerstein | |
| 2007/0038983 A1 | 2/2007 | Stienhans | |
| 2007/0061739 A1 | 3/2007 | Stulski | |
| 2007/0074170 A1 | 3/2007 | Rossmann | |
| 2007/0168975 A1 | 7/2007 | Kessler | |
| 2009/0019083 A1* | 1/2009 | Bacon | 707/104.1 |

OTHER PUBLICATIONS

Sommerville, "Software Engineering 8", 2006, China Machine Press, originated from http://www.pearsoned.co.uk/, Chapters 18-32, 386 pages.*

* cited by examiner

*Primary Examiner* — Ted T Vo

(57) ABSTRACT

Human rules and heuristics may be applied in a logic determination to promote relevance of an output for testing due to a changed object on an application. The output comprises an indication of one or more objects from a plurality of available objects that are to be tested due to the changed object on the application.

15 Claims, 3 Drawing Sheets

OUTPUT FROM CHANGED OBJECT ON APPLICATION

CROSS REFERENCE TO RELATED APPLICATIONS

This Application claims the benefit of U.S. provisional patent application Ser. No. 61/002,850, filed Nov. 13, 2007, titled "Output From Changed Object On Application," which application is hereby incorporated by reference herein as if reproduced in full below.

BACKGROUND

Organizations apply changes to their computer systems. The changes can help the organization to keep up to speed with business needs. Testing is helpful to understanding an impact of a change on a computer system.

DESCRIPTION OF THE DRAWINGS

Features of exemplary implementations of the invention will become apparent from the description, the claims, and the accompanying drawings in which:

DETAILED DESCRIPTION

Referring to the BACKGROUND section above, an approach to Change Impact Testing (CIT) recognizes an audience as the quality assurance (QA) team that needs practical advice on what to test after making a change. The list of items to test can often be quite exhaustive, and often more than a real QA person can reasonably test.

A set of rules can cut through the noise and say which impacted objects are worth testing, and which impacted objects are not worth testing. A testable object in an example comprises a transaction. The rules are based on inputs from experts who actually needed to make such decisions. The experts may have experience in software such as offered by SAP: Systems Applications and Products in Data Processing, headquartered in Walldorf, Germany.

Techniques serve to track for dependencies. For example, not every object dependency is equally significant. A subset of impacts can have greater relative significance. Automation may serve to filter objects considered less significant and/or relevant and/or limit depth of the analysis to such depth that is determined needed and/or desired for giving testing recommendations. A general mechanism for finding dependencies may be arranged and/or inclined to perform a deep analysis such as through the first algorithm 202, and the second algorithm 204 may serve to stop the analysis of an object at a point where further analysis may be determined to not make a difference in the testing recommendations.

Figure 1:
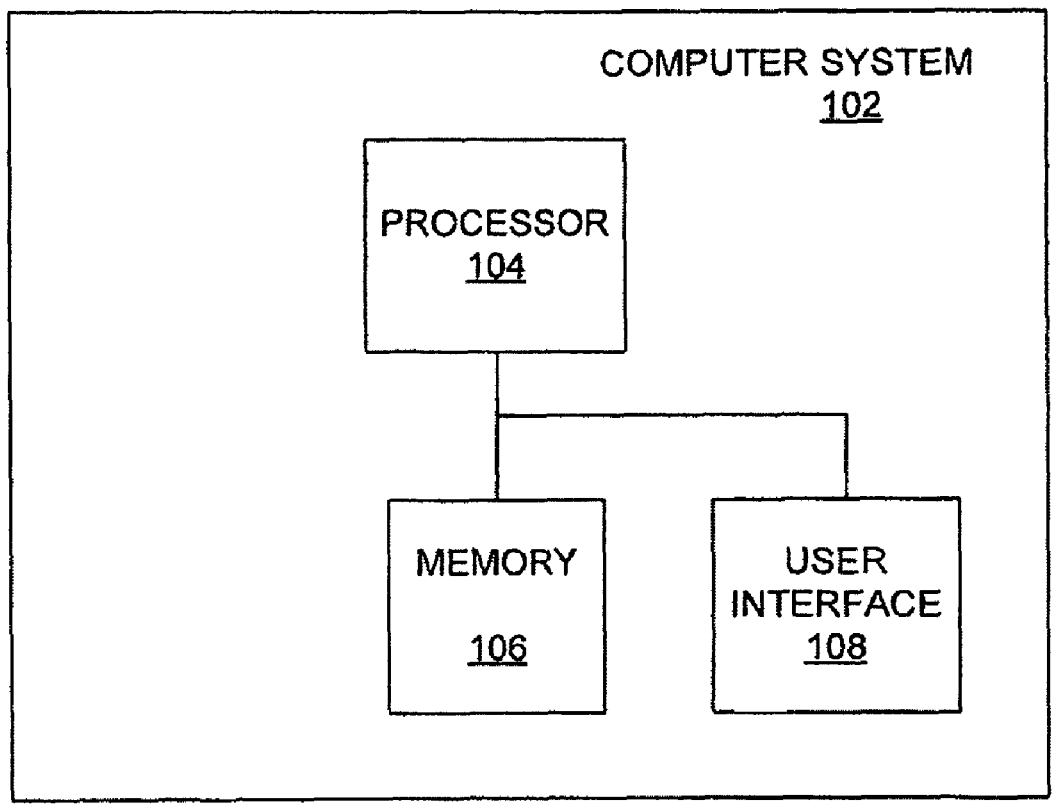
FIG. 1 is a representation of an implementation of an apparatus that comprises one or more computer systems employable with one or more users and/or one or more experts.
Figure 1:
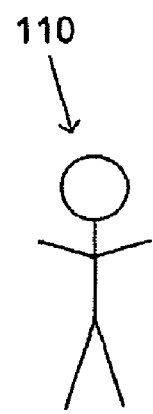
Figure 1:
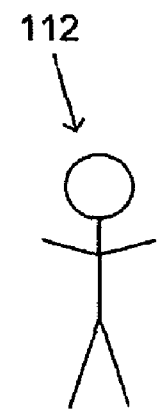

Turing to FIG. 1, an implementation of an apparatus 100 in an example comprises one or more computer systems 102 employable with one or more user 110 and/or one or more experts 112. The computer system 102 comprises one or more processors 104, one or more memories 106, and one or more user interfaces 108. The processor 104 executes in the memory 106 one or more of an algorithm, procedure, program, process, mechanism, engine, model, coordinator, module, application, software, code, and/or logic. The user interface 108 in an example comprises a display and/or data and/or information stream and/or feed.

Figure 2:
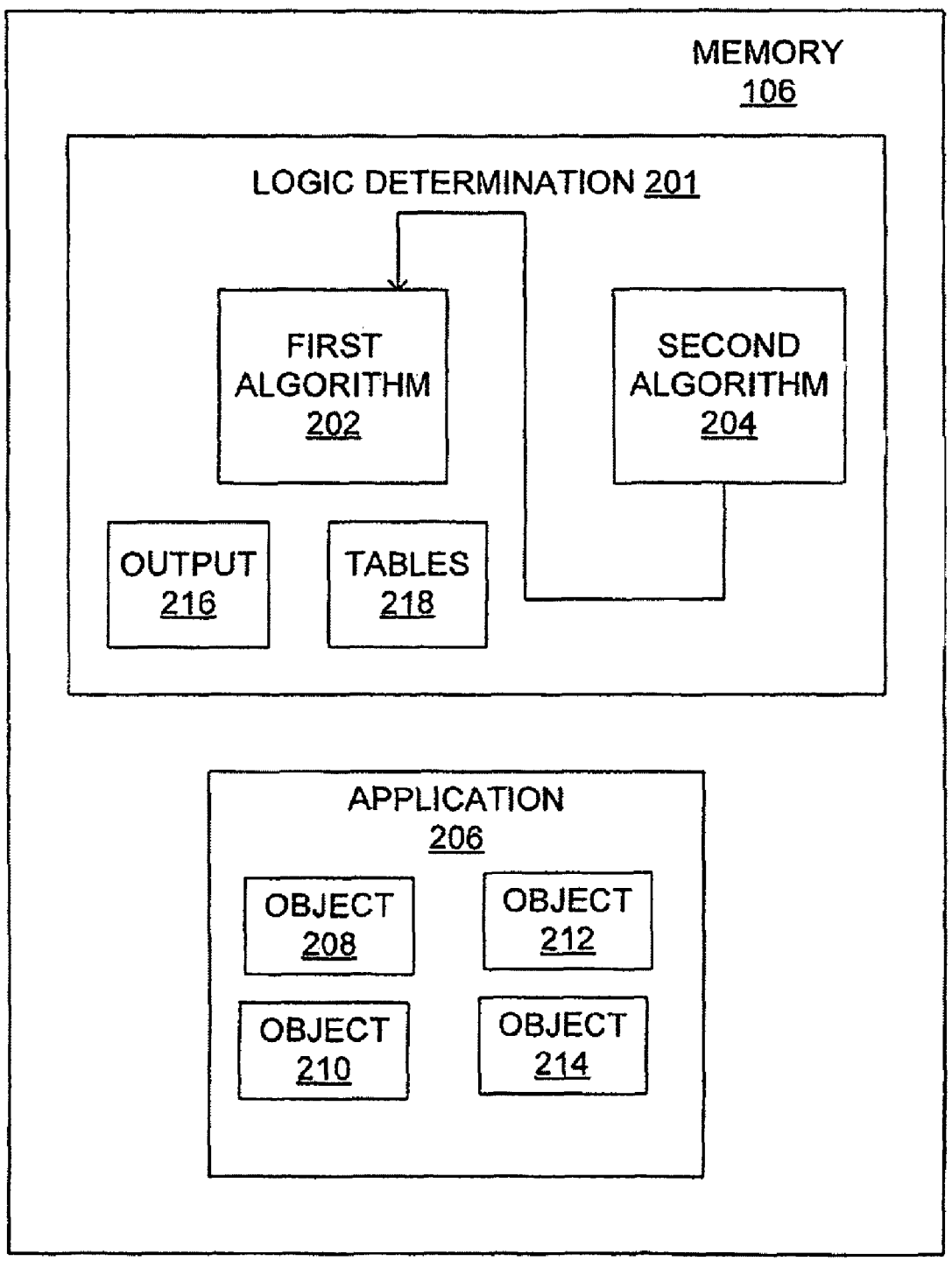
FIG. 2 is a representation of a memory of an implementation of the apparatus of FIG. 1 and illustrates a logic determination that employs a plurality of algorithms to provide an output as an indication of one or more objects from a plurality of available objects that are to be tested due to a changed object on an application.

Turning to FIG. 2, a logic determination 201 employs a plurality of algorithms such as first algorithm 202 and second algorithm 204 to provide an output 216 from the memory 106. The logic determination 201 is executable by the processor 104 to provide the output 216 as an indication of one or more objects from a plurality of available objects 208, 210, 212, 214 that are to be tested due to a changed object on an application 206. The application 206 in an example comprises the objects 208, 210, 212, 214. The application 206 in an example comprises an enterprise resource planning (ERP) application, for example, an SAP application such as an SAP realtime data processing third generation (R/3) application.

One or more of the objects 208, 210, 212, 214 may be changed, for example, to comprise a changed object. A change in one or more of the objects 208, 210, 212, 214 may impact the computer system 102. An example of the application 206 viewed from the logic determination 201 may comprise one or more particular objects as a subset more likely to be changed, and other one or more particular objects as another subset more likely to be impacted and tested. A further example of the logic determination 201 may consider any of the objects as candidates to be changed and also to be tested. Another example of the logic determination 201 may make a hard distinction between changed objects and tested objects of the application 206.

Figure 3:
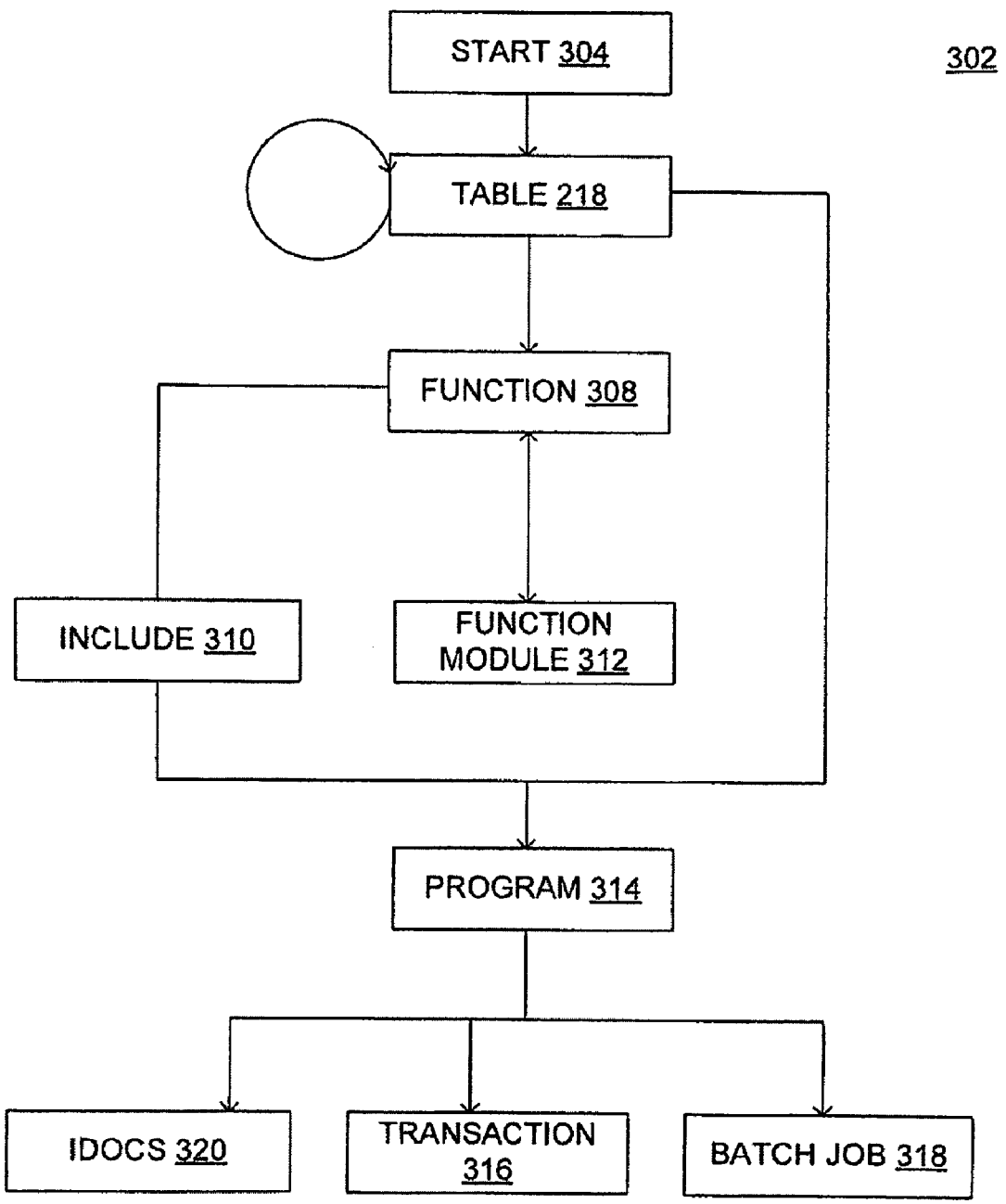
FIG. 3 is a representation of an exemplary logic flow for analysis of the application of FIG. 2.

Referring to FIGS. 2 and 3, the application 206 may comprise a plurality of types of objects, for example, tables 218, functions 308, function modules 312, programs 314, includes 310, transactions 316, batch jobs 318, and/or IDOCS 320. The table 218 in an example comprises data and logic. The function 308 in an example comprises logic flow that is employable from any part of the application 206. The function module 312 in an example comprises a wrapping mechanism for the functions 308. The program 314 in an example comprises application flow. The include 310 in an example serves to break logic into small units. The transaction 316 in an example comprises a logic object such as the business logic. The batch job 318 in an example comprises flow is invocable through employment of an event. IDOCS 320 comprise intermediate documents such as for SAP integration using application linking and enabling (ALE).

Referring to FIG. 2, a testable object 208, 210, 212, 214 in an example comprises a transaction, batch job, function, and/or program. An exemplary implementation may often inform the user 110 about transactions, batch jobs, functions, and/or programs and might not inform the user 110 about other objects. An exemplary implementation may change all objects within a change, with all objects possibly impacted by another object. An exemplary implementation may have all objects appear in all phases of a process and/or logic flow: as changed objects initiating the process, during the process, and in the end to inform the user 110 of the objects to test. In an exemplary SAP R/3 application as the application 206, objects tested by the logic determination 201 may often comprise transactions and batch jobs. Further exemplary implementations of the application 206 may also return programs. The output objects or areas may comprise the transactions, batch jobs, functions, and programs that the logic determination 201 may recommend for testing. In SAP application and/or other implementations of the application 206, the logic determination 201 may add other object types to the testing recommendations.

The first and second algorithms 202, 204 serve to apply human rules from the experts 112 and heuristics in the logic determination 201 to promote relevance of the output 216 for testing due to a changed object of the objects 208, 210, 212, 214 on the application 206. The experts 112 may have a variety of reasons why they would not recommend testing an object. For example, objects may be unlikely to be tested because the object is technically unlikely to cause the application 206 to fail. The first and second algorithms 202, 204 in an example provide the output 216 to the user interface 108. The output 216 comprises an indication of one or more objects from a plurality of available objects of the objects 208, 210, 212, 214 that are to be tested due to the changed object on the application 206.

The human rules are created from human experts as the experts 112. Pattern derived heuristics may be employed. The set of rules applied may result from advice of the experts 112 and/or a set of heuristics that can identify output objects such as transactions and other areas that are not worth testing and removable from the list of the objects 208, 210, 212, 214 that are to be tested due to the changed object on the application 206. The rules may serve as a filter of output objects such as transactions and other areas.

For example, the logic determination 201 may employ a strategy that identifies transactions starting with "s_" as system transactions unneeded and/or undesired for testing. In addition, the logic determination 201 may employ a strategy that identifies "*03" as display transactions unneeded and/or undesired for testing, for example, in many and/or most situations. The transaction strings presented are examples. The concept can be applied to a number of environments whether or not enterprise resource planning (ERP) applications, SAP applications, for example, SAP R/3, and/or other environments. The logic determination 201 may define patterns of system transactions and/or the like in other environments. For example, the logic determination 201 may identify patterns for transactions not to be tested because the transactions are shaded by other main transactions.

The logic determination 201 may employ a master view and a main transaction. For example, the logic determination 201 may, for example, employ a heuristic based on a recognition of the SAP structure of a master view and a main transaction. For example, two local algorithms can extract from the application 206 which transaction is the main transaction from a set of transaction and stress this transaction to a quality assurance (QA) function and/or person such as the user 110. A certain area may be impacted but one of the transactions may be most relevant so testing it should be enough as it uses the other transaction or goes through its ingredients. An algorithm filters out the transactions that shade the main transaction so QA can focus on what is more significant. The two local algorithms in an example comprise two heuristics out of many heuristics that the second algorithm 204 may employ. For example, a heuristic may recognize the SAP master view/main transaction structure, and filter out the master view. The logic determination 201 in an example considers master view and main transaction for analysis of an SAP application that uses this structure. For example, two transactions may work together and/or be structured where one transaction is a master view and the other is the main transaction. An exemplary second algorithm 204 comprises an ability to recognize such a structure and filter out everything except the main transaction as an example of a heuristic built into the logic determination 201 from the experts 112 who identified that the main transaction is significant for testing and another transaction is less or not significant.

The logic determination 201 may employ governance for the decisiveness of the rules. For example, if the rule is very strong, it can override what the first algorithm 202 suggested; however, the additions made by the rule can be considered as additions on top of what the algorithm suggested. An exemplary embodiment encodes best QA practices as a set of rules. Looking at a given technical impact as the output of the first algorithm 202, may be employed to tell what good QA people have done in the past in the given situation, for example, as the heuristics. The rules exist inside the second algorithm, 204.

A determination of relations is made among and/or between the plurality of available objects 208, 210, 212, 214 from the application 206. The human rules are applied to the relations to obtain the output 216. A subset of the objects 208, 210, 212, 214 is collected as more useful than other objects of the plurality of available objects for notification to a user 110 of the application 206 in view of the changed object, or any number, of objects that may be changed. The output 216 comprises an indication of the subset of objects 208, 210, 212, 214 that are to be tested due to the changed object on the application 206.

Collecting the subset of objects as more useful than the other objects for notification to the user 110 of the application 206 in view of the changed object may withhold the other objects from notification to the user 110 of the application 206 as unlikely to be tested, under the human rules from expert advice from the experts 112.

The logic determination 201 comprises iterations of the first and second algorithms 202, 204. The first and second algorithms 202, 204 operate in a plurality of iterations. The logic determination 201 receives an identification of a change on an application 206. The change comprises one or more changed objects 208, 210, 212, 214 on the application 206. The one or more changed objects are employed in the first algorithm 202 of a first iteration to search for other objects that directly use the one or more changed objects. Rules are applied in the second algorithm 204 at an end of the first iteration to determine an input for the first algorithm 202 in a second iteration.

The logic determination 201 in an example employs one or more of the one or more changed objects in the second iteration. In another example, the logic determination 201 withholds one or more of the one or more changed objects from employment in the second iteration. The logic determination 201 employs the second algorithm 204 to apply the rules at the end of the first iteration to determine the input for the second iteration to comprise one of: an output of the first algorithm 202; a modified output of the first algorithm 202; or information that excludes an output of the first algorithm 202. The logic determination 201 employs the second algorithm 204 to apply the rules at the end of each iteration to determine an input for the first algorithm 202 in a next iteration to comprise one of: an output of the first algorithm 202; a modified output of the first algorithm 202; or information that excludes an output of the first algorithm 202.

The logic determination 201 applies the first and second algorithms 202, 204 in each iteration. The logic determination 201 employs the second algorithm 204 to apply the rules at the end of each iteration to determine the input for the subsequent iteration to comprise one of: an output of the first algorithm 202; a modified output of the first algorithm 202; or information that excludes an output of the first algorithm 202.

The logic determination 201 extracts the one or more changed objects from the change on the application 206. The logic determination 201 sorts the other objects that directly use the one or more changed objects into types. The logic determination 201 searches through tables 218 of the types to find additional objects that directly use the one or more changed objects.

The logic determination 201 runs the first algorithm 202 in parallel with the second algorithm 204. The second algorithm 204 completes the first algorithm 202 through determination of a nature of an output of the first algorithm 202 and how to proceed with the output. The logic determination 201 operates the second algorithm 204 on an output of the first algorithm 202 in iteration through application of a set of rules and heuristics on each object 208, 210, 212, 214 that is determined by the first algorithm 202 to directly use a changed object on the application 206. The logic determination 201 employs a different approach for each type of change created on the application 206.

The logic determination 201 employs a strategy that determines what objects to handle. The first and second algorithms 202, 204 work through iterations. An output of the second algorithm 204 becomes an input of the first algorithm 202 in the next iteration. The logic determination 201 may handle all objects 208, 210, 212, 214 that directly use a changed object on the application 206, in future iterations and perhaps other than immediately successive iterations such as by staggering, prioritizing, and/or skipping objects in one or more next iterations.

Each type of change has a strategy in the logic determination 201 that defines how to handle the change on the application 206. The strategy defines the relations between the objects 208, 210, 212, 214 that the logic determination 201 identifies as significant and/or relevant. Each iteration in the logic determination 201 finds the objects 208, 210, 212, 214 that directly use the object of interest and then the second algorithm 204 applies the heuristics and rules.

The logic determination 201 employs a different approach for each type of change created on the application 206. A plurality of types of changes can be applied on the application 206. For each type, the root that the first algorithm 202 takes and the relation of interest between the objects 208, 210, 212, 214 can differ. The strategy defines for each type of change what are the interesting relations and what are the best objects 208, 210, 212, 214 to handle next. The strategy of the logic determination 201 groups objects 208, 210, 212, 214 from the same type to obtain reduced and/or minimum times of addressing the application 206, for example, reducing access to the application 206 and enhancing, increasing, and/or improving performance.

An illustrative description of an exemplary operation of an implementation of the apparatus 100 is presented, for explanatory purposes. Turning to FIG. 3, an exemplary logic flow 302 comprises a plurality of steps for analysis of the application 206 as an exemplary SAP R/3 application. The first algorithm 202 finds dependencies between, for example, tables 218 and functions 308. For each dependency found by the first algorithm 202, the second algorithm 204 tells whether or not the dependency between that table 218 and that function 308 is significant for testing.

In the logic flow 302, the START 304 is when the user 110 supplies a change to the application 206 through employment of the user interface 108. The logic determination 201 extracts the changed objects from the supplied change and gives the changed objects to the first algorithm 202 for the START 304 of the process for the logic flow 302 after consulting the strategy. The first algorithm 202 employs the addresses of the application 206 to extract relations with other objects such as tables 218, functions 308, includes 310, function modules 312, programs 314, transactions, 316, batch jobs 318, and IDOCS 320.

The first algorithm 202 employs the strategy to identify relations for which the first algorithm 202 should search. For example, a table 218 may not directly employ a function 308. The output of the first algorithm 202 is handed to the second algorithm 204 to employ the human rules and heuristics and determine what to do with each object 208, 210, 212, 214 that came from the first algorithm 202. This may be performed in each iteration.

An exemplary end condition for the first algorithm 202 is now discussed. The first algorithm 202 at a point stops from a determination that no more iterations are needed before the logic determination 201 provides an output 216 to the user 110. For example, the first algorithm 202 makes a determination that the changed object is being employed by objects 208, 210, 212 in a significant way, and by object 214 in an insignificant way. So there would be no more iterations following from object 214. Iterations may be determined per object. In this example, the logic determination 201 would continue to iterate on objects 208, 210, 212, but will have no further iterations to find the impact of object 214 on any other objects.

The second algorithm 204 in an example may make a determination, based on heuristics, that object 208 is insignificant for testing. Although in an example the object 208 may heavily employ the changed object, no experienced QA person would ever test the object 208, so the second algorithm 204 drops the object 208. Iterating further on the objects 210 and 212, the logic determination 201 finds that there are no further objects in the computer system 102 that employ the object 210. So, the object 210 will be returned as output 216 to the user 110, for example, subject to the second algorithm 204 considering the object 210 to comprise a significant object for testing. If the object 210 has survived to this point in the logic flow 302 without getting dropped, and the second algorithm 204 considers the object 210 significant, then the logic determination 201 identifies the object 210 as recommended for testing.

Since the object 212 is employed by additional objects, iteration continues. Perhaps object 208 employs the object 212. Nothing may prevent an object from being dropped at some iteration and then showing up in a subsequent iteration as employing an object in the subsequent iteration. The logic determination 201 therefore continues the logic flow 302 to run iterations of the first and second algorithms 202, 204 on the object 212 and its descendents and/or successive objects until we find no more significant usages or have dropped all further objects due to the rules of the second algorithm 204.

The second algorithm 204 in an example previously in the logic flow 302 determined that object the 208 is insignificant for testing, and will probably make the same determination again and the object 208 will be dropped. The logic determination 201 leaves open a possibility that the second algorithm 204 might conditionally consider, an object as important for testing, depending on the dependencies and/or usages that led to the object. Rules and heuristics may take this into consideration. To prevent the first and second algorithms 202, 204 from running endlessly, the second algorithm 204 may employ, as one of its rules or heuristics, a limit to the number of iterations.

The logic determination 201 may provide the output 216 from iterations wherein each iteration comprises a strategy employed by the logic determination 201 that checks the output from the second algorithm 204 and determines whether a type of each object is one of a set of types determined for presentation to a user 110 of the application 206. An exemplary description of derivation of the output 216 from iterations of the logic flow 302 is now presented. For the output 216 from the iterations, in each iteration a strategy employed by the logic determination 201 checks the output from the second algorithm 204 and determines whether the type of each object is one of the types that are determined for presentation to the user 110, for example, transactions 316, batch jobs 318, and IDOCS 320. The iterations in an example may stop when all objects were iterated on such as the first and second algorithms 202, 204 handled them in any of the preceding iterations; and all the objects are of types that have been determined as should be presented to the user 110. If both these conditions are met in an example, iteration stops and the logic determination 210 will output as the output 216 the objects that the logic determination 210 holds.

There may be employing of the second algorithm 204 to apply the rules at the end of each iteration to determine the input for the subsequent iteration to comprise one of: an output of the first algorithm 202; a modified output of the first algorithm 202; or information that excludes an output of the first algorithm 202. There may be providing of the output 216 from iterations wherein each iteration comprises a strategy employed by a logic determination 210 that checks the output from the second algorithm 204 and determines whether a type of each object is one of a set of types determined for presentation to a user 110 of the application 206. There may be stopping of the iterations and returning of a subject object as the output 216 from the iterations from the one or more changed objects upon: the first algorithm 202 making a determination that further iteration on the subject object is unneeded; and the second algorithm 204 making a determination to decline drop of the subject object through exclusion of the output of the first, algorithm 202 from a subsequent iteration. There may be stopping of the iterations and withholding the subject object as the output 216 from the iterations from the one or more changed objects upon: the second algorithm 204 making a determination to drop the subject object through exclusion of the output of the first algorithm 202 from the subsequent iteration.

For example, a change comprises a changed object of type program 314. A first iteration of the first and second algorithms 202, 204 brings a transaction 316. A second iteration starts with the transaction 316. The first algorithm 202 iterates on the transaction 316 and to output other objects that directly employ this transaction 316. The second algorithm 204 works with the output from the first algorithm. Strategy of the logic determination 201 determines whether the transaction 316 should be presented to the user 110. At the end of the first iteration, the strategy checks the output as the transaction 316 and determines whether the object is presentable to the user 110. If so, the transaction 316 is added such as to a special holder for all the objects to be presented to the user 110 for that change on the application 206. In the second iteration both the first and second algorithms 202, 204 iterate on the transaction 316 from the first iteration.

In an exemplary implementation, there will be no further iterations following from an object, if both of the following are true:

A. The first algorithm 202 determines, for any reason, that there is no need or desire to iterate any further on this object.

B. The second algorithm 204 does not drop the object, such as through exclusion from an output of the first algorithm 202. If A. and B. are both true, then the object is returned as the output 216 to the user 110.

In an additional example, there will be no further iterations following from an object if the second algorithm 204 does drop the object. In such a case the iterations will stop and the object will not be returned as the output 216 to the user 110.

An implementation of the apparatus 100 in an example comprises a plurality of components such as one or more of electronic components, chemical components, organic components, mechanical components, hardware components, optical components, and/or computer software components. A number of such components can be combined or divided in an implementation of the apparatus 100. In one or more exemplary implementations, one or more features described herein in connection with one or more components and/or one or more parts thereof are applicable and/or extendible analogously to one, or more other instances of the particular component and/or other components in the apparatus 100. In one or more exemplary implementations, one or more features described herein in connection with one or more components and/or one or more parts thereof may be omitted from or modified in one or more other instances of the particular component and/or other components in the apparatus 100. An exemplary technical effect is one or more exemplary and/or desirable functions, approaches, and/or procedures. An exemplary component of an implementation of the apparatus 100 employs and/or comprises a set and/or series of computer instructions written in or implemented with any of a number of programming languages, as will be appreciated by those skilled in the art. An implementation of the apparatus 100 in an example comprises any (e.g., horizontal, oblique, angled, or vertical) orientation, with the description and figures herein illustrating an exemplary orientation of an exemplary implementation of the apparatus 100, for explanatory purposes.

An implementation of the apparatus 100 in an example encompasses an article and/or an article of manufacture. The article comprises one or more computer-readable signal-bearing media. The article comprises means in the one or more media for one or more exemplary and/or desirable functions, approaches, and/or procedures.

An implementation of the apparatus 100 in an example employs one or more computer readable signal bearing media. A computer-readable signal-bearing medium in an example stores software, firmware and/or assembly language for performing one or more portions of one or more implementations. An example of a computer-readable signal bearing medium for an implementation of the apparatus 100 comprises a memory and/or recordable data storage medium of the memory 106. A computer-readable signal-bearing medium for an implementation of the apparatus 100 in an example comprises one or more of a magnetic, electrical, optical, biological, chemical, and/or atomic data storage medium. For example, an implementation of the computer-readable signal-bearing medium comprises one or more floppy disks, magnetic tapes, CDs, DVDs, hard disk drives, and/or electronic memory. In another example, an implementation of the computer-readable signal-bearing medium comprises a modulated carrier signal transmitted over a network comprising or coupled with an implementation of the apparatus 100, for instance, one or more of a telephone network, a local area network ("LAN"), a wide area network ("WAN"), the Internet and/or a wireless network. A computer-readable signal-bearing medium in an example comprises a physical computer medium and/or computer-readable signal bearing tangible medium.

The steps or operations described herein are examples. There may be variations to these steps or operations without departing from the spirit of the invention. For example, the steps may be performed in a differing order, or steps, may be added, deleted, or modified.

Although exemplary implementation of the invention has been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A method, using a computer processor to execute instructions, stored in a memory, to perform the steps of:
using a first and a second algorithm to apply human rules and heuristics in a logic determination to select an output for testing due to a changed object on an application, wherein the output comprises an indication of one or more objects from a plurality of available objects that are to be tested due to the changed object on the application:
executing instructions to collect the one or more objects of the plurality of available objects as more useful than other objects of the plurality of available objects for notification to a user of the application in view of the changed object; and
executing instructions to withhold the other objects from notification to the user of the application as unlikely to be tested, under the human rules from expert advice.

2. The method of claim 1, further comprising:
using a first and a second algorithm to apply the human rules provided from human experts.

3. The method of claim 2, further comprising:
using a first and a second algorithm to make a determination of relations between the plurality of available objects from the application; and
using a first and a second algorithm to apply the human rules to the relations to obtain the output.

4. The method of claim 1, wherein the one or more objects comprise a subset of objects of the plurality of available objects that are to be tested due to the changed object on the application, wherein the subset of objects comprises two or more objects of the plurality of available objects that are to be tested due to the changed object on the application, wherein the output comprises an indication of the subset of objects that are to be tested due to the changed object on the application.

5. A method, using a computer processor to execute instructions, stored in a memory, to perform the steps of:
receiving an identification of a change on an application, wherein the change comprises one or more changed objects on the application;
employing the one or more changed objects in a first algorithm of a first iteration to search for other objects that directly use the one or more changed objects; and
applying rules in a second algorithm at an end of the first iteration to determine an input for the first algorithm in a second iteration, wherein applying rules in the second algorithm at the end of the first iteration to determine the input for the first algorithm in the second iteration comprises:
employing the second algorithm to apply the rules, at the end of the first iteration to determine the input for the second iteration to comprise one of:
an output of the first algorithm;
a modified output of the first algorithm; or
information that excludes an output, of the first, algorithm.

6. The method of claim 5, wherein the step of receiving the identification of the change on the application comprises:
extracting the one or more changed objects from the change on the application.

7. The method of claim 5, wherein the step of employing the one or more changed objects in the first iteration of the first algorithm to search for other objects that directly use the one or more changed objects comprises:
sorting the other objects that directly use the one or more changed objects into types;
searching through tables of the types to find additional objects that directly use the one or more changed objects.

8. The method of claim 5, wherein the first and second algorithms each operate in both the first and second iterations.

9. The method of claim 5, wherein a plurality of iterations comprises the first and second iterations, wherein the first and second algorithms each operate in each of the plurality of iterations.

10. The method of claim 5, further comprising:
employing one or more of the one or more changed objects in the second iteration.

11. The method of claim 5, further comprising:
withholding one or more of the one or more changed objects from employment in the second iteration.

12. The method of claim 5, further comprising:
applying the first and second algorithms in each iteration.

13. A method, using a computer processor to execute instructions, stored in a memory, to perform the steps of:
receiving an identification of a change on an application, wherein the change comprises one or more changed objects on the application;
employing the one or more changed objects in a first algorithm of a first iteration to search for other objects that directly use the one or more changed objects; and
applying rules in a second algorithm at an end of the first iteration to determine an input for the first algorithm in a second iteration, wherein the step applying rules in the second algorithm at the end of the first iteration to determine the input for the first algorithm in the second iteration comprises:
employing the second algorithm to apply the rules at the end of each iteration to determine an input for the first algorithm in a next iteration to comprise one of:
an output of the first algorithm;
a modified output of the first algorithm; or
information that excludes an output of the first algorithm.

14. A method, using a computer processor to execute instructions, stored in a memory, to perform the steps of:
receiving an identification of a change on an application, wherein the change comprises one or more changed objects on the application;
employing the one or more changed objects in a first algorithm of a first iteration to search for other objects that directly use the one or more changed objects; and
applying rules in a second algorithm at an end of the first iteration to determine an input for the first algorithm in a second iteration, wherein applying rules in the second algorithm includes:
employing the second algorithm to apply the rules at the end of each iteration to determine the input for the subsequent iteration to comprise one of:
an output of the first algorithm;
a modified output of the first algorithm; or
information that excludes an output of the first algorithm;
providing output from iterations wherein each iteration comprises a strategy employed by a logic determination that checks the output from the second algorithm and determines whether a type of each object is one of a set of types determined for presentation to a user of the application;

stopping the iterations and returning a subject object as the output from the iterations from the one or more changed objects upon:
  the first algorithm making a determination that further iteration on the subject object is unneeded; and
  the second algorithm making a determination to decline drop of the subject object through exclusion of the output of the first algorithm from a subsequent iteration;

stopping the iterations and withholding the subject object as the output from the iterations from the one or more changed objects upon:
  the second algorithm making a determination to drop the subject object through exclusion of the output of the first algorithm from the subsequent iteration.

15. A method, using a computer processor to execute instructions, stored in a memory, to perform the steps of:
  running a first algorithm in parallel with a second algorithm;
  wherein the second algorithm completes the first algorithm through determination of a nature of an output of the first algorithm and how to proceed with the output; and
  wherein the step of running the first algorithm in parallel with the second algorithm comprises:
    executing instructions to operate the second algorithm on an output of the first algorithm in iteration through application of a set of rules and heuristics on each object that is determined by the first algorithm to directly use a changed object on an application; and
    executing instructions to employ a different set of rules and heuristics for each type of change created on an application.

* * * * *